United States Patent
Demick et al.

(10) Patent No.: US 7,267,407 B1
(45) Date of Patent: Sep. 11, 2007

(54) HEAD RESTRAINT ADJUSTMENT AND TRIM CLOSEOUT APPARATUS AND METHOD

(75) Inventors: Robert L. Demick, Macomb, MI (US); Daniel W. Booth, Harrison Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/363,710

(22) Filed: Feb. 28, 2006

(51) Int. Cl.
*B60N 2/48* (2006.01)
(52) U.S. Cl. .................................................. 297/410
(58) Field of Classification Search ................. 297/220, 297/391, 410
See application file for complete search history.

(56) References Cited

U.S. PATENT DOCUMENTS

| | | | | |
|---|---|---|---|---|
| 3,572,834 A | * | 3/1971 | Herzer et al. | 297/410 |
| 4,265,482 A | * | 5/1981 | Nishimura et al. | 297/391 |
| 4,606,578 A | * | 8/1986 | Yasui | 297/408 |
| 4,858,994 A | * | 8/1989 | Yamashita | 297/391 |
| 5,711,579 A | * | 1/1998 | Albrecht | 297/410 |
| 5,992,937 A | * | 11/1999 | Pilhall | 297/408 |
| 6,068,337 A | * | 5/2000 | De Filippo | 297/391 |
| 6,149,233 A | * | 11/2000 | Takei et al. | 297/220 |
| 6,499,805 B1 | * | 12/2002 | Watadani | 297/408 |
| 6,874,854 B2 | * | 4/2005 | Terrand et al. | 297/410 |

* cited by examiner

*Primary Examiner*—Peter R. Brown

(57) ABSTRACT

An apparatus and method for adjusting the height of a vehicle head restraint includes a top cover, latch assembly, and bottom cover. The top cover is connected to the head restraint. A latch assembly is moveable in a lateral direction relative to a latch post, and a bottom cover connects to the top cover, sandwiching the latch assembly between the top and bottom covers. When the button portion of the latch assembly is actuated, the latch assembly unlatches from the latch post, allowing the height of the head restraint to be adjusted. By directly connecting to the underside of the head restraint, the apparatus is further operative to close out the bottom closeout opening on the underside of the head restraint and provide an aesthetically pleasing finish.

10 Claims, 1 Drawing Sheet

HEAD RESTRAINT ADJUSTMENT AND TRIM CLOSEOUT APPARATUS AND METHOD

TECHNICAL FIELD

The present invention relates to an apparatus and method for adjusting the height of a vehicle head restraint wherein the height adjustment apparatus is designed to trim out the underside of the head restraint, providing an aesthetically pleasing finish.

BACKGROUND OF THE INVENTION

Automotive seat head restraints typically contain at least one notched post wherein one end of the post is permanently attached to a substructure contained within the head restraint body. The exposed surface of the notched post is sleeved within a pocket contained within the automobile seat body, the pocket opening typically being situated on the top surface of the automotive seat body. The occupant of the vehicle adjusts the head restraint position by actuating a button located on the seat body immediately adjacent to the latch post pocket. This action unlatches the notched post from the seat body, and as long as the button is depressed, the head restraint can be vertically adjusted. Once the head restraint reaches the desired height, the button is released, and the post is then latched at the nearest notch on the post. The weight of the head rest and latch post is supported by the latch assembly at a point just above the surface of the seat body. The underside of the head restraint is never in direct functional contact with the height adjustment apparatus.

Due to the presence of protruding head restraint latch posts, the underside of a vehicle head restraint body is in a relatively unfinished state compared to the more visible external surfaces of the automotive seat assembly. Specifically, head restraint latch posts necessitate the use of an equivalent number of openings in the fabric trim of the head restraint. Also, the underside of the head restraint may contain a seam where the edges of the upholstery wrapping converge. Various methods are used to finish, trim, or close out, these openings, in the attempt to provide an aesthetically pleasing, closely mated fit between latch post and fabric opening. Standard finishing methods include sewing, surging, and the application of unsightly j-clips and j-arrows to pull the opposing fabric trim edges together. Additionally, j-clips and j-arrows have the disadvantage of having to be sewn to the fabric, adding extra labor and/or time to the manufacturing process.

The repeated movement of the latch posts can cause fraying of the fabric of the head restraint body or bagging of the underlying trim material. Another problem associated with the prior art is the protrusion of head restraint fill material through the latch post openings. Fraying, bagging, and protrusion of fill material combine to produce a potentially unsightly head restraint finish, as the underside of the head restraint is clearly visible when the latch post is extended more than a few notches above the fully retracted position.

SUMMARY OF THE INVENTION

The present invention provides an apparatus and method for adjusting the height of an automotive seat head restraint and using the height adjustment apparatus to trim the underside of the restraint in an aesthetically pleasing manner.

A height adjuster for a head restraint in accordance with the invention includes an external surface for easy accessibility and is movable with respect to at least one latch post extending from a seat assembly. A latch assembly may be in or on the head restraint, at least one portion of the latch assembly being actuatable in one manner with respect to the latch post for latching the head restraint and actuatable in another manner with respect to the latch post so that the height of the head restraint can be adjusted.

The latch assembly is actuatable by applying pressure at an easily accessible portion on an external surface of the head restraint, such as a button or pressure point on a back or side of the head restraint.

An apparatus for adjusting the height of a vehicle head restraint includes a latch assembly containing a button and a latch. The latch assembly is operative to move laterally in one direction with respect to a latch rod, thereby unlatching the latch assembly from the rod upon depression or actuation of the button, which in turn allows the head restraint to move longitudinally along the axis of the latch rod or series of rods. The latch assembly is operative to re-latch to the latch post upon release of the button, thereby setting the height of the head restraint at the desired level.

Preferably, the latch assembly is biased by a spring, which provides the requisite lateral counterforce to the button, thereby returning the button to its starting position upon release.

The button is configured to face an external surface of the head restraint, providing a finished aesthetic appearance. Preferably, the button is framed by a bezel to further improve on the desired aesthetic trim.

Another aspect of the invention provides a method for closing out the underside of a vehicle head restraint using a head restraint height adjustment apparatus. The method includes: A) providing a bottom cover sufficiently coextensive with the closeout opening on the underside of the head restraint; B) sandwiching a latch assembly between the bottom cover and the underside of the head restraint; and C) connecting the bottom cover to the underside of the head restraint to aesthetically trim out the closeout opening.

The above features and advantages, and other features and advantages of the present invention, are readily apparent from the following detailed description of the best mode for carrying out the invention when taken in connection with the accompanying drawings.

DESCRIPTION OF THE PREFERRED EMBODIMENTS

Figures 1, 2:
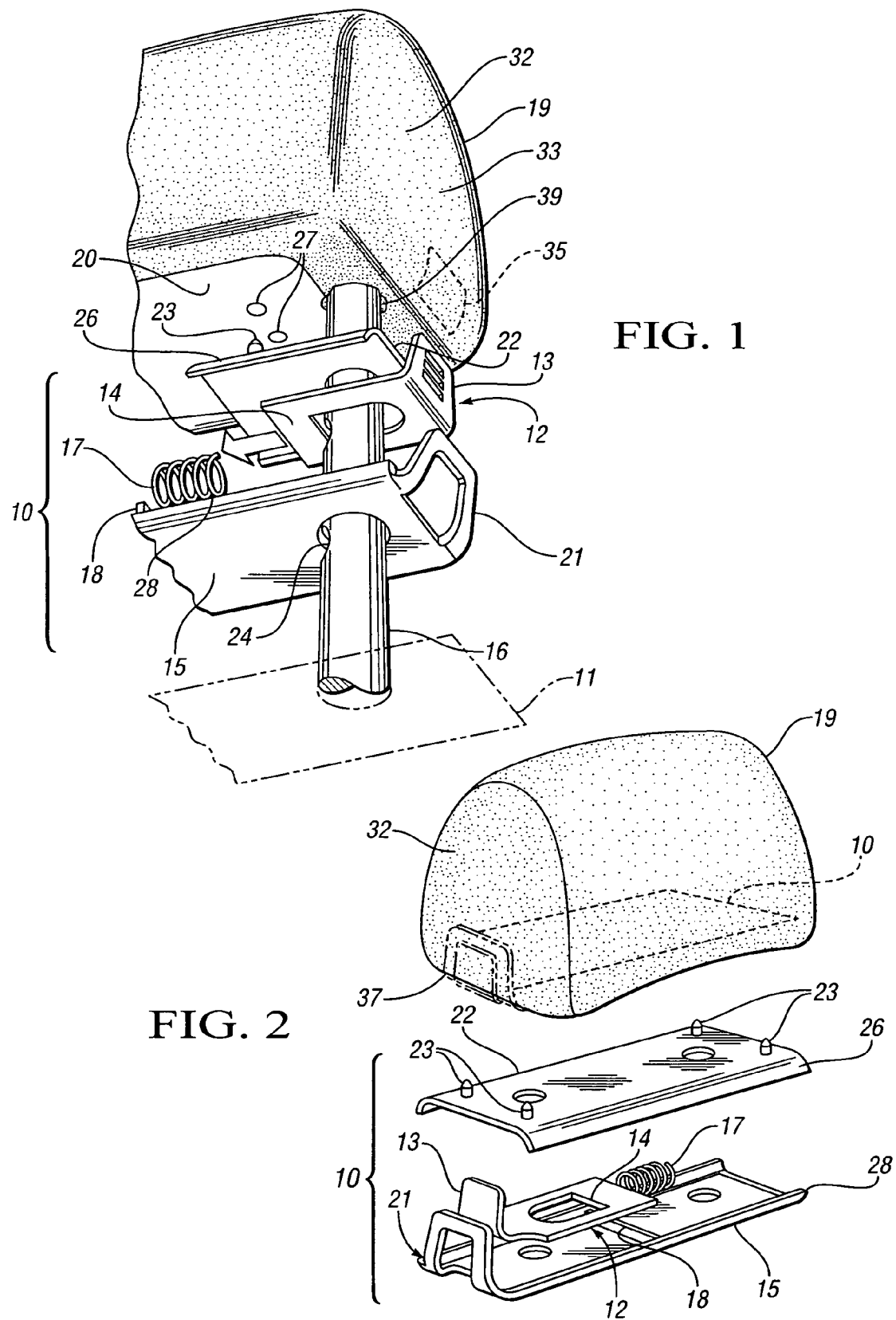
FIG. 1 is a fragmentary, perspective, rear schematic illustration from the bottom of a vehicle head restraint head adjustment apparatus in accordance with the invention, wherein the head restraint adjustment apparatus is exploded with respect to the head restraint, and showing the latch assembly in a schematically latched position.
FIG. 2 is a perspective schematic illustration from another angle showing a side of the vehicle head restraint apparatus of FIG. 1, wherein the apparatus is shown in both an exploded pre-attached condition and, in phantom, as it would be oriented in a fully attached and concealed condition.

FIGS. 1 and 2 are schematic illustrations of a height adjuster and trim closeout 10 for a head restraint 19. The height adjuster and trim closeout 10 controls the movement of the head restraint 19 along the longitudinal axis of a latch post 16 which is affixed within and extends upwardly from an automotive seat assembly 11, depicted in FIG. 1. Those skilled in the art will recognize a variety of materials that may be employed to form the externally visible portions of height adjuster and trim closeout 10, including various metals and plastics, which may be burnished, stippled or otherwise finished in an aesthetically pleasing manner.

The position of the head restraint 19 is adjusted by actuating a button portion 13 of a latch assembly 12 having a latch portion 14 operatively connected to the push button 13. The latch portion 14 of latch assembly 12 is moveable laterally or actuatable in a manner or direction relative to the latch post 16, as indicated by the block arrow in FIG. 1. This action selectively separates the latch portion 14 of assembly 12 from one of the notches 24 of latch post 16, allowing the head restraint 19 to move upwardly or downwardly along the longitudinal axis of the latch post 16 to different positions.

A spring portion 17 of the latch assembly 12 provides a biasing counterforce to the latch portion 14 of assembly 12, allowing the latch portion 14 of latch assembly 12 to return in another manner or direction to its initial position in one of the notches 24 upon release of the button 13. The spring 17 is compressed between the unitary button 13/latch portion 14 and a spring stop 18, so that when the button 13 is released, the spring 17 pushes the button 13 outboard, allowing the latch portion 14 of latch assembly 12 to re-latch in one of the notches 24 in the latch post 16.

The spring stop 18 is molded, stamped, or otherwise formed into or on the upper surface of the bottom closeout cover 15. The latch assembly 12 including spring 17 is sandwiched or entrapped between the bottom closeout cover 15 and a top cover 22. The bottom closeout cover 15 and top cover 22 are designed with mating surfaces or edges 26, 28 to allow them to snap together without separate fasteners or adhesives, thereby enclosing or entrapping the latch assembly 12 with its spring portion 17. The bottom closeout cover 15 of the height adjuster and trim closeout 10 is sufficiently coextensive with the bottom closeout opening 20, which is an opening formed by or within the fabric/upholstery material covering 32 of head restraint 19 located at the bottom or underside of the head restraint 19, as shown in FIG. 1, and/or latch post opening 39 on the underside of the head restraint 19 to aesthetically trim, i.e. "close out" or finish, the bottom opening 20 and latch post opening 39 when bottom closeout cover 15 is connected to the underside of the head restraint 19. The preferred method of connection is the insertion of ribbed push clips 23, such as push-in "Christmas tree™" clips having flexible retaining ribs, into mating holes 27 depicted in FIGS. 1 and 2, although rivets, snaps, and similar fasteners would also suffice.

To further improve the aesthetic trim, the button portion 13 of the latch assembly 12 may be framed by a bezel 21. The button 13 and bezel 21 are preferably aligned in a 90 degree angle facing outward, so as to allow their inner surfaces to conform to the external surface of the head restraint 19, as depicted in FIG. 1 at 35. However, the button 13 and bezel 21 portion of the bottom cover 15 may be formed so as to align with varying angles of the external surface of the head restraint 19 other than 90 degrees. While the best mode discloses a design suitable for positioning the button 13 and bezel 21 on a lateral surface 33 of the head restraint 19 for ease in accessibility, it is possible, by modifying latch assembly 12, to situate the button on the front or rear surfaces of head restraint 19. As depicted in phantom at 37 in FIG. 2, it may also be desirable to conceal or hide the button 13 and/or bezel 21 beneath the fabric/upholstery material covering 32 of the head restraint 19 to further improve aesthetic appeal, and/or to mark the location of a concealed button 13 exposed on the external surface of the head restraint in a suitable manner consistent with vehicle aesthetics to indicate a press-point for actuating the latch button portion 13.

The latch assembly 12 may also be within the head restraint 19 at least one portion of which assembly such as a button or actuator 13 is actuatable in one manner with respect to the latch post for latching the head restraint and actuatable in another manner with respect to the latch post so that the height of the head restraint can be adjusted. In such an arrangement, the one portion 13 of latch assembly 12 may be actuated by applying pressure at an easily accessible portion such as 37 on an external surface of the head restraint which could be an easily accessible portion on a back or side of head restraint 19 such as at 35. Then the occupant in the seat could reach back and grasp the head rest with their hands, the fingers curling around to the back of the head restraint at which point or button, a squeeze or forward pull with their fingers would actuate the latch assembly so that the unlatched head restraint could slide up or down.

This invention also includes an improved method of making an adjustable height adjuster and trim closeout 10 with an aesthetically trimmed bottom opening 20. The method comprises sandwiching or entrapping the latch assembly 12 and the spring 17 between the top cover 22 and the bottom closeout cover 15 and then connecting the bottom closeout cover 15 including the sandwiched or entrapped latch assembly 12 to head restraint 19 in a sufficient manner so that the bottom closeout cover 15 sufficiently coextensively covers the bottom opening 20 to aesthetically trim bottom opening 20 and the latch post opening 39 which received the latch post 16.

While the best modes for carrying out the invention have been described in detail, those familiar with the art to which this invention relates will recognize various alternative designs and embodiments for practicing the invention within the scope of the appended claims.

The invention claimed is:

1. A height adjuster for a head restraint having outer upholstery forming a bottom opening at an underside of the head restraint, the head restraint being configured for use with a vehicle seat having at least one head restraint latch post attached thereto, the height adjuster comprising:

a bottom closeout cover attachable to the underside of the head restraint and sufficiently coextensive with the bottom opening to aesthetically trim the bottom opening; and a latch assembly entrapped between said bottom closeout cover and the head restraint when said bottom closeout cover is attached to the underside of the head restraint, at least one portion of said latch assembly being moveable in one direction with respect to said at least one head restraint latch post for latching the head restraint at a first height and movable in another direction with respect to said at least one head restraint latch post for unlatching the head restraint so that the height of the head restraint can be adjusted to a different second height;

wherein said latch assembly includes a button portion for actuating said latch assembly, and said bottom closeout cover has a bezel portion framing said button portion and facing an external surface of the head restraint for a finished aesthetic appearance, said button portion being in a position for easy accessibility at or beneath said external surface of the head restraint; and wherein the height adjuster is positioned substantially external to the head restraint and substantially adjacent to said underside of the head restraint.

2. The height adjuster of claim 1, wherein said latch assembly includes a spring for biasing said at least one portion of said latch assembly for movement in said one direction.

3. The height adjuster of claim 1, wherein said button portion is covered by the outer upholstery of the head restraint, and is actuated by pressing the outer upholstery covering said push button, thereby further improving the aesthetic trim by concealing said button portion.

4. The height adjuster of claim 1, including a substantially flat top cover connectable to the underside of the head restraint, wherein said bottom closeout cover and said top cover are adapted to snap together without the use of fasteners or adhesives to thereby entrap said latch assembly between said top cover and said bottom closeout cover.

5. The height adjuster of claim 4, wherein said top cover is connectable to the underside of the head restraint using a fastener selected from the group consisting of rivets, ribbed push clips, and snaps.

6. A method of adjusting the height of a head restraint, wherein said head restraint connects with a seat assembly via at least one latch post extending longitudinally from said seat assembly into the head restraint, the method comprising:
   configuring a latch assembly with a button for actuating said latch assembly;
   providing a bottom closeout cover having a bezel portion;
   entrapping said latch assembly between said bottom closeout cover and the underside of the head restraint so that said bezel portion frames said button and faces a lateral surface of the head restraint for a finished aesthetic appearance;
   actuating said button to thereby move said latch assembly in one direction with respect to said at least one latch post, to unlatch said latch assembly from said at least one latch post and allow said head restraint to move longitudinally along said at least one latch post.

7. The method of claim 6, including biasing said button during movement of said latch assembly to provide counterforce sufficient to relatch said latch assembly to said at least one latch post at a desired height setting of said head restraint upon release of said button.

8. A method of aesthetically trimming a bottom opening formed in an upholstery covering for a height-adjustable head restraint, the bottom opening being positioned on the underside of the height-adjustable head restraint, the method comprising:
   providing a bottom closeout cover having a bezel portion;
   entrapping a height-adjusting latch assembly between a substantially flat top cover and a substantially flat bottom close out cover so that said bezel portion frames said button and faces a lateral surface of the head restraint; and
   connecting said one of said substantially flat top cover and substantially flat bottom close out cover to the underside of the height-adjustable head restraint to sufficiently coextensively cover the bottom opening and thereby aesthetically trim the bottom opening.

9. A height adjuster for a head restraint having a lateral surface and a bottom surface, and being movable with respect to at least one latch post extending from a seat assembly, the height adjuster comprising:
   a latch assembly at least one portion of which is actuatable in one direction with respect to the at least one latch post for latching the head restraint and actuatable in another direction with respect to the at least one latch post for unlatching the head restraint so that the height of the head restraint can be adjusted; and
   a bottom closeout cover and a separate top cover adapted to snap together without the use of fasteners or adhesives to thereby sandwich said latch assembly between said top cover and said bottom closeout cover;
   wherein said one of said top cover and said bottom cover is attached to the bottom surface of the head restraint and is positioned external to the head restraint, and wherein the head restraint is actuated by applying pressure at an easily accessible portion positioned along the lateral surface of the head restraint.

10. The height adjuster of claim 9, wherein said easily accessible portion is a button on a back or side of the head restraint.

* * * * *